(12) United States Patent
Rameau et al.

(10) Patent No.: US 10,496,784 B2
(45) Date of Patent: Dec. 3, 2019

(54) DESIGNING A PHYSICAL SYSTEM CONSTRAINED BY EQUATIONS

(71) Applicant: Dassault Systemes, Velizy Villacoublay (FR)

(72) Inventors: Jean-Francois Rameau, Lisses (FR); Philippe Serre, Saint-Ouen (FR); André Clement, Palaiseau (FR)

(73) Assignee: Dassault Systemes, Velizy Villacoublay (FR)

( * ) Notice: Subject to any disclaimer, the term of this patent is extended or adjusted under 35 U.S.C. 154(b) by 649 days.

(21) Appl. No.: 14/624,151

(22) Filed: Feb. 17, 2015

(65) Prior Publication Data

US 2015/0242366 A1    Aug. 27, 2015

(30) Foreign Application Priority Data

Feb. 21, 2014    (EP) .................................... 14305243

(51) Int. Cl.
    *G06F 17/50*    (2006.01)
(52) U.S. Cl.
    CPC .......... *G06F 17/5086* (2013.01); *G06F 17/50* (2013.01); *G06F 2217/06* (2013.01)
(58) Field of Classification Search
    CPC ...... G06F 17/16; G06F 17/50; G06F 17/5086; G06F 2217/06
    (Continued)

(56) References Cited

U.S. PATENT DOCUMENTS 4,868,766 A * 9/1989 Oosterholt .............. G06T 19/00
                                                         345/420
5,253,189 A * 10/1993 Kramer ............... G06F 17/5086
                                                         700/246
(Continued)

FOREIGN PATENT DOCUMENTS

JP    2002324088 A  *  11/2002
JP    2011048768 A  *   3/2011
(Continued)

OTHER PUBLICATIONS

Marghitu, Dan B. Mechanisms and Robots Analysis with MATLAB®. Springer Science & Business Media, 2009. ISBN 978-1-84800-390-3. pp. 1-4 and 37-40.*

(Continued)

*Primary Examiner* — Kamini S Shah
*Assistant Examiner* — John E Johansen
(74) *Attorney, Agent, or Firm* — Hamilton, Brooks, Smith & Reynolds, P.C.

(57) ABSTRACT

An embodiment of present invention is computer-implemented method for designing a physical system constrained by a system of equations involving variables. The method includes partitioning the variables involved in the equations into fixed variables and unfixed variables, thereby setting the system to a restricted system with a degree of freedom equal to one. The method further includes computing a parameterized curve of solutions of the restricted system in the domain of the unfixed variables. The method further includes for at least one pair of unfixed variables, displaying the projection of the curve in the product of the domains of the pair. The method further includes navigating the solutions on the parameterized curve and representing, real-time, the current navigation position on the projection of the (Continued)

curve. Such a method improves the design of a physical system constrained by equations involving variables.

11 Claims, 6 Drawing Sheets

(58) Field of Classification Search
USPC .............................................................. 703/2
See application file for complete search history.

(56) References Cited

U.S. PATENT DOCUMENTS

| | | | | |
|---|---|---|---|---|
| 5,805,858 | A * | 9/1998 | Kumamoto | ............. G06T 17/00 |
| | | | | 345/441 |
| 5,831,875 | A * | 11/1998 | Hirata | ................. G06F 17/5086 |
| | | | | 345/419 |
| 5,835,693 | A * | 11/1998 | Lynch | .................... B25J 9/1605 |
| | | | | 345/473 |
| 6,268,871 | B1 * | 7/2001 | Rice | ...................... G06T 11/203 |
| | | | | 345/442 |

FOREIGN PATENT DOCUMENTS

| | | | | |
|---|---|---|---|---|
| JP | 2013025735 A | * | 2/2013 | ......... G05B 13/0265 |
| JP | 2013160710 A | * | 8/2013 | |
| WO | WO-2007047216 A2 | * | 4/2007 | .......... H01J 49/0031 |

OTHER PUBLICATIONS

Hetrick, J. A., and S. Kota. "An energy formulation for parametric size and shape optimization of compliant mechanisms." Journal of Mechanical Design 121.2 (1999). pp. 229-234. (Year: 1999).*
Japanese Patent Office Decision to Grant a Patent dated Oct. 16, 2018 for Japanese Patent Application No. 2015-032956 Entitled "The design of a physical system which is constrained by the equation". pp. 1-2. (Year: 2018).*
European Patent Office Communication dated Jul. 18, 2019 for European Patent Application No. 14 305 243.9 Entitled "Designing a physical system constrained by equations". pp. 1-10. (Year: 2019).*
State Intellectual Property Office of People's Republic of China First Office Action dated Nov. 23, 2018 for Patent Application No. 201510161546.X Entitled "Designing a physical system constrained by equations". pp. 1-5. (Year: 2018).*
State Intellectual Property Office of People's Republic of China Second Office Action dated Apr. 23, 2019 for Patent Application No. 201510161546.X Entitled "Designing a physical system constrained by equations". pp. 1-5. (Year: 2019).*
Gu, J., et al., "Linear and Nonlinear Control of a Robotic Excavator," *J. Cent. South. Univ.* 19:1823-1831 (2012).
Hansen, E., "Global Optimization Using Interval Analysis-The Multi-Dimensional Case," *Numer. Math*, 34:247-270 (1980).
Hsu, C. et al., "A Constraint-based Manipulator Toolset for Editing 3D Objects," *Proceedings of the Fourth Symposium on Solid Modeling and Applications*, Atlanta, GA, May 14-16, 1997.
Rossi, F., "Handbook of Constraint Programming," (2006).
Sohrt, W., and Brüderlin, "Interaction with Constraints in 3D Modeling," *SMA '91 Proceedings of the First ACM Symposium on Solid Modeling Foundations and CAD/CAM Applications, Department of Computer Science*, University of Utah, pp. 387-396.
Sutherland, I.E., "Sketch Pad, A Man-machine Graphical Communication System," *Proceedings of the Spring Joint Computer Conference*, Detroit, May 1963.
Tsang, E., "Foundations of Constraint Satisfaction," *Department of Computer Science*, University of Essex, Colchester, Essex, United Kingdom (1993).
EP Search Report completed dated Jul. 21, 2014 for European Application No. 14305243.9, filed Feb. 21, 2014 entitled "*Designing a Physical System Constrained by Equations.*"
Vajda, S., "*Mathematical Programming*" Dover Publications, Inc., (Mineola, NY) 2009 pp. 4.

* cited by examiner

DESIGNING A PHYSICAL SYSTEM CONSTRAINED BY EQUATIONS

RELATED APPLICATION

This application claims priority under 35 U.S.C. § 119 or 365 to European Application No. 14305243.9, filed Feb. 21, 2014. The entire teachings of the above application are incorporated herein by reference.

FIELD OF THE INVENTION

The invention relates to the field of computer programs and systems, and more specifically to a method, computer system and program for designing a physical system constrained by equations involving variables.

BACKGROUND

A number of computer systems and programs are offered on the market for the design, the engineering and the manufacturing of physical systems. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by DASSAULT SYSTEMES (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the computer system delivers an open object model linking products, processes, resources to enable dynamic, knowledge-based product creation and decision support that drives optimized product definition, manufacturing preparation, production and service.

The field of physical system design is wide.

One popular concept is "optimization". The goal of optimization is to set up a design problem in terms of objective functions and constraints, both involving design parameters. Then, a dedicated solver is run in order to provide the designer with a "best" solution in terms of minimizing the objective function. A wide class of solver's algorithms can tackle the optimization from a wide range of computer science (numerical analysis, combinatorial optimization, artificial intelligence). When setting up an optimization problem, the designer is asked to define the "best possible" solution by adding constraints and criteria. Such a "best possible" criterion surely helps the algorithm. Furthermore, the designer is asked to provide an initial condition for the algorithm to compute a neighboring solution. Many searching algorithms run heuristic methods to find a solution. A typical reference in this field is the document "*Mathematical Programming: Theory and Algorithms*", M. Minoux, 2008.

Another popular concept is the "constraint satisfaction problem" (CSP in the following). Typical references include the following documents: "*Foundations of Constraint Satisfaction*", Tsang, Edward (1993); "*Global optimization using interval analysis*", Eldon Hansen (2003); and "*Handbook of constraint programming*", Francesca Rossi (2006). The goal of CSP is to set up the design problem in terms of functions and constraints, both involving design parameters. Then, a dedicated solver is run in order to provide the designer with a "small" subset of design parameters values including the solutions. Here again, a wide class of solver's algorithms can tackle the CSPs from a wide range of computer science (including numerical analysis, combinatorial optimization, artificial intelligence). A typical real life design problem does not feature a unique solution. Solutions can be locally unique (no other solutions in the neighborhood of an existing solution, but other solutions "far" from an existing solution) or can be a continuum of solutions. Some design problems can even feature both cases.

Optimization technology is efficient when the problem is formulated in terms of a "best possible" solution. This formulation is good for the algorithm, but the designer is forced to add extra constraints and objectives for this purpose. When the designer is asked to provide an initial condition, the computed solution highly depends on it but this dependency is out of control. It is well known that iterative algorithms can "jump" from one solution to another in an unpredictable way. Consequently, trying to control the variation of the solution by adjusting the initial condition is not efficient. In real life, the process of designing a physical system does not always provide a natural criterion for optimization and uniqueness, especially at early design steps. Conversely, the designer would like to investigate the field of solutions in order to understand structures of solutions, parameters influences, parameters dependencies, or unsatisfactory solutions. The state of the art optimization technology does not allow this capability. As explained before, the goal of CSP is to narrow the range of the subset that includes the solutions of the problem. Nevertheless, navigation in this subset is the responsibility of the designer. This navigation is made difficult because of the following phenomenon. The interval [a, b] is output by the CSP algorithm, but it includes two smaller intervals [a, a'] and [b', b] of solutions. In such a case, the larger interval [a, b] includes a "hole" ] a', b' [separating smaller intervals of solutions.

Within this context, there is still a need for an improved solution for designing a physical system constrained by equations involving variables.

SUMMARY OF THE INVENTION

It is therefore provided a computer-implemented method for designing a physical system constrained by a system of equations involving variables. The method comprises the step of partitioning the variables involved in the equations into fixed variables and unfixed variables, thereby setting the system to a restricted system with a degree of freedom equal to 1. The method also comprises the step of computing a parameterized curve of solutions of the restricted system in the domain of the unfixed variables. The method also comprises the step of, for at least one pair of unfixed variables, displaying the projection of the curve in the product of the domains of the pair. And the method also comprises navigating the solutions on the parameterized curve and representing, real-time, the current navigation position on the projection of the curve.

The method may comprise one or more of the following:
the projection of the curve is displayed in an orthonormal frame of which the X-axis and the Y-axis each correspond to a respective one of the pair of unfixed variables;
the displaying of the projection of the curve is performed for several pairs of unfixed variables, frames with an X-axis corresponding to the same unfixed variable being vertically aligned and frames with a Y-axis corresponding to the same unfixed variable being horizontally aligned;
the displaying is performed, for at least one set of unfixed variables, for all the pairs of the set, the frames being arranged according to a triangular grid;
representing the current navigation position on the projection of the curves comprises displaying a marker of the horizontal and vertical alignment of the projection of the current navigation position on the projection of the curves;
the partitioning, the computing, and the displaying are iterated, the partitioning being different between two successive iterations;
the navigation position is the same at the transition between two successive iterations;
the navigating is continuous;
the navigating comprises sliding, by the user, a displayed cursor;
the method comprises determining the at least one set of unfixed variables by the user;
determining the at least one set of unfixed variables comprises hiding one or more unfixed variables and/or splitting the group of unhidden unfixed variables into sets; and/or
the physical system is a mechanical product, a mechatronic product, an electrical product, a biological body, a packaging product, an architectural product, a multi-physic system, a financial system, or a demographic evolution model.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
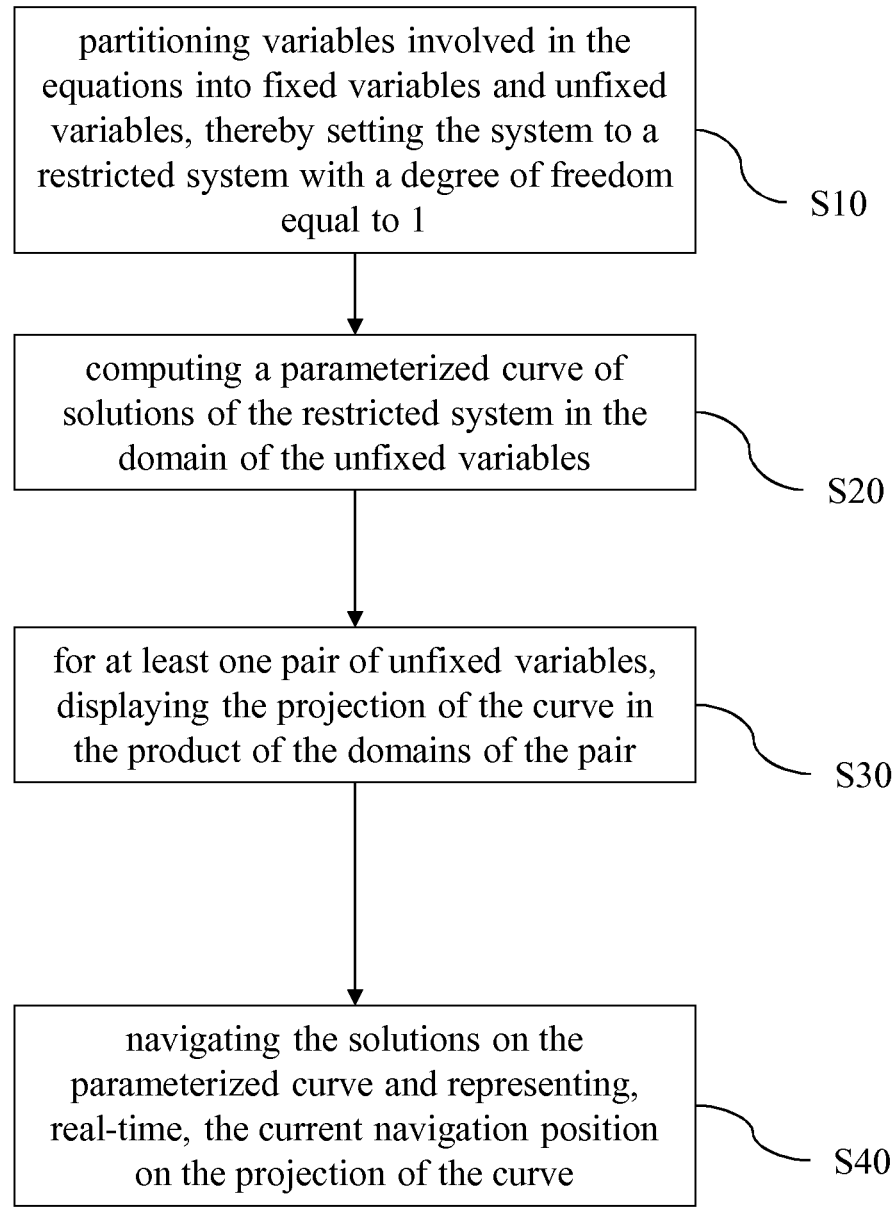
FIG. 1 shows a flowchart of an example of the method.

With reference to the flowchart of FIG. 1, it is proposed a computer-implemented method for designing a physical system constrained by a system of equations involving variables. The method comprises the step of partitioning S10 the variables involved in the equations into fixed variables and unfixed variables. The method thereby sets the system (of equations) to a restricted system with a degree of freedom equal to 1. The method also comprises computing S20 a parameterized curve of solutions of the restricted system in the domain of the unfixed variables. The method also comprises, for at least one pair of unfixed variables, displaying S30 the projection of the curve in the product of the domains of the pair. And the method also comprises navigating S40 the solutions on the parameterized curve and representing, real-time, the current navigation position on the projection of the curve. Such a method improves the design of a physical system constrained by equations involving variables.

Notably, since the navigating S40 is performed on solutions of the restricted system, the navigation S40 respects/fulfils the system of equations constraining the physical system and thus provides physically acceptable solutions. Since the navigating S40 is performed by representing real-time the current navigation position, the method offers the designer a way to apprehend the solution space in a "trial-and-error"-like manner, and thus facilitates the design. The partitioning S10 of the variables involved in the equations and the consequent computing S20 of the parameterized curve and displaying S30 of the projection of the curve allows transforming the navigation in the space of all solutions into a restricted navigation in 2D. This greatly facilitates apprehension of the solution space, as 2D is a particularly effective type of displaying from a design point of view. Because the transformation of a complex navigation problem into a 2D navigation performed by the method involves partitioning the variables that are involved in the equations constraining the physical system, such variables being semantically meaningful to the designer, the method yet again facilitates the design of the physical system to the user.

The method is computer-implemented. This means that the steps (or substantially all the steps) of the method are executed by at least one computer system (i.e. any system comprising automatic computing capabilities). Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined. For instance, the steps of partitioning S10, computing S20 and displaying S30 may be fully automatic, possibly with an initial triggering by the user/designer. The navigating S40 on the other hand may be performed via user-interaction.

A typical example of computer-implementation of the method is to perform the method with a computer system adapted for this purpose. Such a computer system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database). The GUI may be adapted to allow the displaying S30 and the navigating S40, for example by comprising a display and/or a haptic device.

The method is for designing a physical system constrained by equations involving variables. A physical system is any portion of the physical universe. For example the physical system may be a physical object. Now, the physical system designed by the method is constrained by equations involving variables. This means that the physical system may be described by a series of parameter values, these parameter values being constrained by (i.e. having to respect) the equations. In this sense, the parameters correspond to the variables of the equations, said variables representing said parameters (the two being assimilated in the following). As known from the field of system design, the parameters and thus the variables may have a semantic meaning to the designer. For example, if the physical system is a physical object, the variables may include the mass, the speed, and/or the volume. The physical system may be any product such as a mechanical product, a mechatronic product, an electrical product, a packaging product, an architectural product. The physical system may be another type of object such as a biological body or a multi-physic system. The physical system may also be a social system such as a financial system or a population (designed by a demographic evolution model).

The equations may describe physical states of the system. The equations may be of the type "$f(\ldots)=0$" where the variables of "$f$" are numeric and continuous (e.g. real numbers). Also, "$f$" may be continuously derivable relative to the continuous variables. Function "$f$" may also have integer (discrete) variables, but such variables may have to be fixed by the user. Such variable may typically not be involved in the steps of method depicted on FIG. 1. The variables may be of any unit (length, angle, mass, and/or energy) or of no unit. Functions "$f$" represent any property modeling the system: mechanical link, mechanism closure, position coordinates, mass conservation, energy conservation, flux conservation.

The designed physical system is a modeled object, i.e. any object defined by data stored in the database. By extension, the expression "modeled object" designates the data itself. According to the type of the computer system implementing the method, the modeled objects may be defined by different kinds of data. The computer system for performing the method may indeed be any combination of a CAD system, a CAE system, a CAM system, a PDM system and/or a PLM system. In those different computer systems, modeled objects are defined by corresponding data. One may accordingly speak of CAD object, PLM object, PDM object, CAE object, CAM object, CAD data, PLM data, PDM data, CAM data, CAE data. However, these computer systems are not exclusive one of the other, as a modeled object may be defined by data corresponding to any combination of these computer systems. A computer system may thus well be both a CAD and PLM system, as will be apparent from the definitions of such systems provided below.

By CAD system, it is meant any computer system adapted at least for designing a modeled object on the basis of a graphical representation of the modeled object, such as CATIA. In this case, the data defining a modeled object comprise data allowing the representation of the modeled object, and thus of the physical system. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing the physical system which is a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

By PLM system, it is meant any computer system adapted for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

CAM stands for Computer-Aided Manufacturing. By CAM solution, it is meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

CAE stands for Computer-Aided Engineering. By CAE solution, it is meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

The physical system may be a product to be manufactured in the real world subsequent to the completion of its virtual design with for instance a CAD software solution or CAD system, such as a (e.g. mechanical) part or assembly of parts, or more generally any rigid body assembly (e.g. a mobile mechanism). A CAD software solution allows the design of products in various and unlimited industrial fields, including: aerospace, architecture, construction, consumer goods, high-tech devices, industrial equipment, transportations, marine, terrestrial and/or offshore oil production or transportation. In this case, the physical system is typically constrained by mechanical equations involving physical variables, including 3D positions, dimensions, mass-related variables, material-related variables, and/or degrees of freedom variables. The equations constraining the product may describe a mechanical state of the product, e.g. including mechanical links, mechanism closure, mass conservation, energy conservation, and/or flux conservation. For example, the equations may describe a global closure equation (known per se in the art).

The physical system may notably be a rigid assembly or a mobile mechanism, that is, a product—e.g. which comprises frame(s), crank(s), piston(s) and/or rod(s) connected together through revolute and/or cylindrical joints, and—which is constrained by a closure equation. Indeed, the method is particularly well-adapted to the design of rigid assemblies and mobile mechanisms. In this field, the system of equations is the so called "closure equation" (or "loop closure equation"). It defines the dimensions and relative positions of rigid bodies by combining rigid motions.

The following references are representative in this field and provide examples of such closure equations:

"Introduction to theoretical kinematics", J. M. Mac Carty, The M.I.T. Press, 1990; and "Fundamental of kinematics and dynamics of machines and mechanisms", Oleg Vinogradov, CRC Press, 2000.

Figure 11:
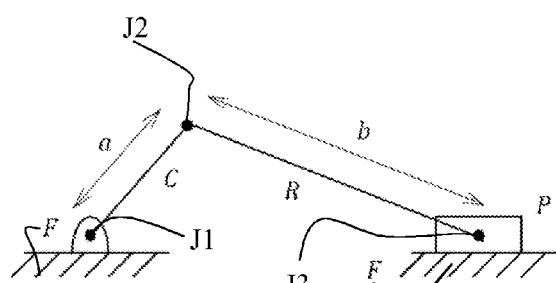
FIGS. 11-12 illustrate an example of the physical system.

A way to define an example of a closure equation is now illustrated with the so called "in line slider crank" mechanism illustrated in FIG. 11. It includes a frame F, which is a grounded reference body, a crank C which is linked to frame F through a revolute joint J1, a rod R, which is linked to the end of crank C and to a piston P through revolute joints J2 and J3, and, finally, piston P, which is linked to rod R through a revolute joint J3 and to frame F through a cylindrical joint (not represented).

Figure 12:
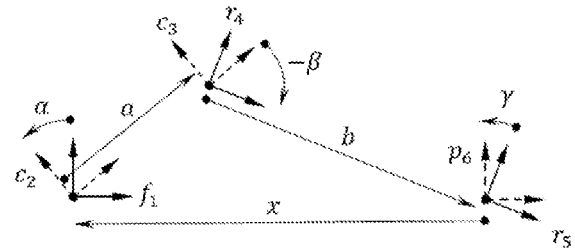

The first step to set up the closure equation is to identify bodies and joints. The mechanism includes four (rigid) bodies: frame, crank, rod, piston respectively noted F, C, R, P. Now, each body includes one or more axis systems in order to specify its dimensions and the linking with other bodies. The frame includes one axis system noted $f_1$, the crank includes two axis systems $c_2$, $c_3$, the rod also includes two axis systems $r_4$, $r_5$ and, finally, the piston includes one axis system $p_6$. These axis systems are represented on FIG. 12.

The second step is to associate rigid motions from one axis system to the other in order to capture dimensions of bodies as well as relative positions between bodies. Rigid motions are defined by homogeneous matrices. This means that the matrix of a rigid motion defined by a 2D rotation of angle θ and by a 2D translation $$\begin{pmatrix} x \\ y \end{pmatrix}$$

is:

$$\begin{pmatrix} \cos\theta & -\sin\theta & x \\ \sin\theta & \cos\theta & y \\ 0 & 0 & 1 \end{pmatrix}$$

This way, combining rigid motions is to perform usual matrix products. By definition, dimensions are rigid motions relating two axis systems of the same body. By definition again, links are rigid motions relating two axis systems from distinct bodies. The dimension of the crank is $D_{23}$ so that $c_3 = D_{23} c_2$ and defined by the translation:

$$D_{23} = \begin{pmatrix} 1 & 0 & a \\ 0 & 1 & 0 \\ 0 & 0 & 1 \end{pmatrix}$$

The dimension of the rod is $D_{45}$ so that $r_5 = D_{45} r_4$ and defined by the translation:

$$D_{45} = \begin{pmatrix} 1 & 0 & b \\ 0 & 1 & 0 \\ 0 & 0 & 1 \end{pmatrix}$$

The link between the frame and the crank is $L_{12}$ so that $c_2 = L_{12} f_1$ and defined by the rotation:

$$L_{12} = \begin{pmatrix} \cos\alpha & -\sin\alpha & 0 \\ \sin\alpha & \cos\alpha & 0 \\ 0 & 0 & 1 \end{pmatrix}$$

The link between the crank and the rod is $L_{34}$ so that $r_4 = L_{34} c_3$ and defined by the rotation:

$$L_{34} = \begin{pmatrix} \cos\beta & -\sin\beta & 0 \\ \sin\beta & \cos\beta & 0 \\ 0 & 0 & 1 \end{pmatrix}$$

The link between the rod and the piston is $L_{56}$ so that $p_6 = L_{56} r_5$ and defined by the rotation:

$$L_{56} = \begin{pmatrix} \cos\gamma & -\sin\gamma & 0 \\ \sin\gamma & \cos\gamma & 0 \\ 0 & 0 & 1 \end{pmatrix}$$

Finally, the link between the piston and the frame is $L_{61}$ so that $f_1 = L_{61} p_6$ and defined by the translation:

$$L_{61} = \begin{pmatrix} 1 & 0 & x \\ 0 & 1 & 0 \\ 0 & 0 & 1 \end{pmatrix}$$

The last step for the closure equation is to write that the combination of all these rigid motion according to the loop topology is equal to the identity $$I = \begin{pmatrix} 1 & 0 & 0 \\ 0 & 1 & 0 \\ 0 & 0 & 1 \end{pmatrix}.$$

Formally:

$$L_{12}D_{23}L_{34}D_{45}L_{56}L_{61}=I$$

By construction, the closure equation involves dimensioning parameters a, b and positioning parameters α, β, γ, x. The details are obtained by computing the matrix products. More precisely, the previous relationship is:

$$\begin{pmatrix} \cos\alpha & -\sin\alpha & 0 \\ \sin\alpha & \cos\alpha & 0 \\ 0 & 0 & 1 \end{pmatrix}\begin{pmatrix} 1 & 0 & a \\ 0 & 1 & 0 \\ 0 & 0 & 1 \end{pmatrix}\begin{pmatrix} \cos\beta & -\sin\beta & 0 \\ \sin\beta & \cos\beta & 0 \\ 0 & 0 & 1 \end{pmatrix}$$
$$\begin{pmatrix} 1 & 0 & b \\ 0 & 1 & 0 \\ 0 & 0 & 1 \end{pmatrix}\begin{pmatrix} \cos\gamma & -\sin\gamma & 0 \\ \sin\gamma & \cos\gamma & 0 \\ 0 & 0 & 1 \end{pmatrix}\begin{pmatrix} 1 & 0 & x \\ 0 & 1 & 0 \\ 0 & 0 & 1 \end{pmatrix} = \begin{pmatrix} 1 & 0 & 0 \\ 0 & 1 & 0 \\ 0 & 0 & 1 \end{pmatrix}$$

Then, by computing the matrix products step by step:

$$\begin{pmatrix} \cos\alpha & -\sin\alpha & a\cos\alpha \\ \sin\alpha & \cos\alpha & a\sin\alpha \\ 0 & 0 & 1 \end{pmatrix}\begin{pmatrix} \cos\beta & -\sin\beta & b\cos\beta \\ \sin\beta & \cos\beta & b\sin\beta \\ 0 & 0 & 1 \end{pmatrix}\begin{pmatrix} \cos\gamma & -\sin\gamma & x\cos\gamma \\ \sin\gamma & \cos\gamma & x\sin\gamma \\ 0 & 0 & 1 \end{pmatrix} =$$
$$\begin{pmatrix} 1 & 0 & 0 \\ 0 & 1 & 0 \\ 0 & 0 & 1 \end{pmatrix}$$

$$\begin{pmatrix} \cos(\alpha+\beta) & -\sin(\alpha+\beta) & b\cos(\alpha+\beta)+a\cos\alpha \\ \sin(\alpha+\beta) & \cos(\alpha+\beta) & b\sin(\alpha+\beta)+a\sin\alpha \\ 0 & 0 & 1 \end{pmatrix}\begin{pmatrix} \cos\gamma & -\sin\gamma & x\cos\gamma \\ \sin\gamma & \cos\gamma & x\sin\gamma \\ 0 & 0 & 1 \end{pmatrix} =$$
$$\begin{pmatrix} 1 & 0 & 0 \\ 0 & 1 & 0 \\ 0 & 0 & 1 \end{pmatrix}$$

$$\begin{pmatrix} \cos(\alpha+\beta+\gamma) & -\sin(\alpha+\beta+\gamma) & x\cos(\alpha+\beta+\gamma)+b\cos(\alpha+\beta)+c\cos\alpha \\ \sin(\alpha+\beta+\gamma) & \cos(\alpha+\beta+\gamma) & -x\sin(\alpha+\beta+\gamma)+b\sin(\alpha+\beta)+a\sin\alpha \\ 0 & 0 & 1 \end{pmatrix} = \begin{pmatrix} 1 & 0 & 0 \\ 0 & 1 & 0 \\ 0 & 0 & 1 \end{pmatrix}$$

Identifying matrix coefficients of left and right sides leads to:

$$\cos(\alpha+\beta+\gamma)=1$$

$$\sin(\alpha+\beta+\gamma)=0$$

$$x\cos(\alpha+\beta+\gamma)+b\cos(\alpha+\beta)+a\cos\alpha=0$$

$$-x\sin(\alpha+\beta+\gamma)+b\sin(\alpha+\beta)+a\sin\alpha=0$$

Which can be simplified:

$$\alpha+\beta+\gamma=0$$

$$x+b\cos(\alpha+\beta)+a\cos\alpha=0$$

$$b\sin(\alpha+\beta)+a\sin\alpha=0$$

The closure equation has the expected shape F(a, b, α, β, γ, x)=0 where $$F(a,b,\alpha,\beta,\gamma,x) = \begin{pmatrix} \alpha+\beta+\gamma \\ x+b\cos(\alpha+\beta)+a\cos\alpha \\ b\sin(\alpha+\beta)+a\sin\alpha \end{pmatrix}$$

And where dimensional parameters are (a, b) and positional parameters are (α, β, γ, x).

Figure 2:
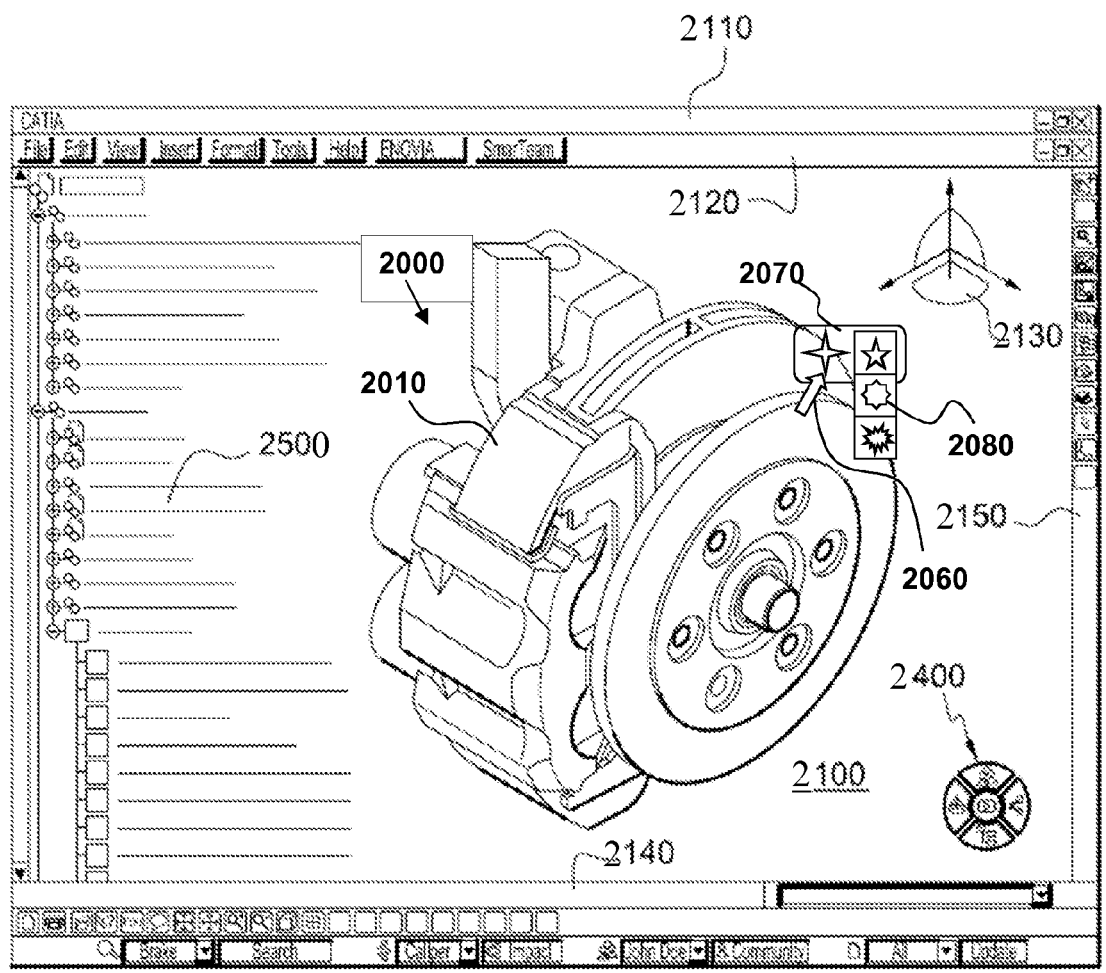
FIG. 2 shows an example of a graphical user interface of the computer system.

FIG. 2 shows an example of the GUI of the system for performing the method, wherein the computer system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. It is noted that 3D modeled object 2000 is represented in 3D on the screenshot of FIG. 2, but GUI 2100 may comprise a function to switch to a specific mode for performing the displaying S30 and the navigating S40 of the method. Examples of the views of such a mode are described later. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen.

The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
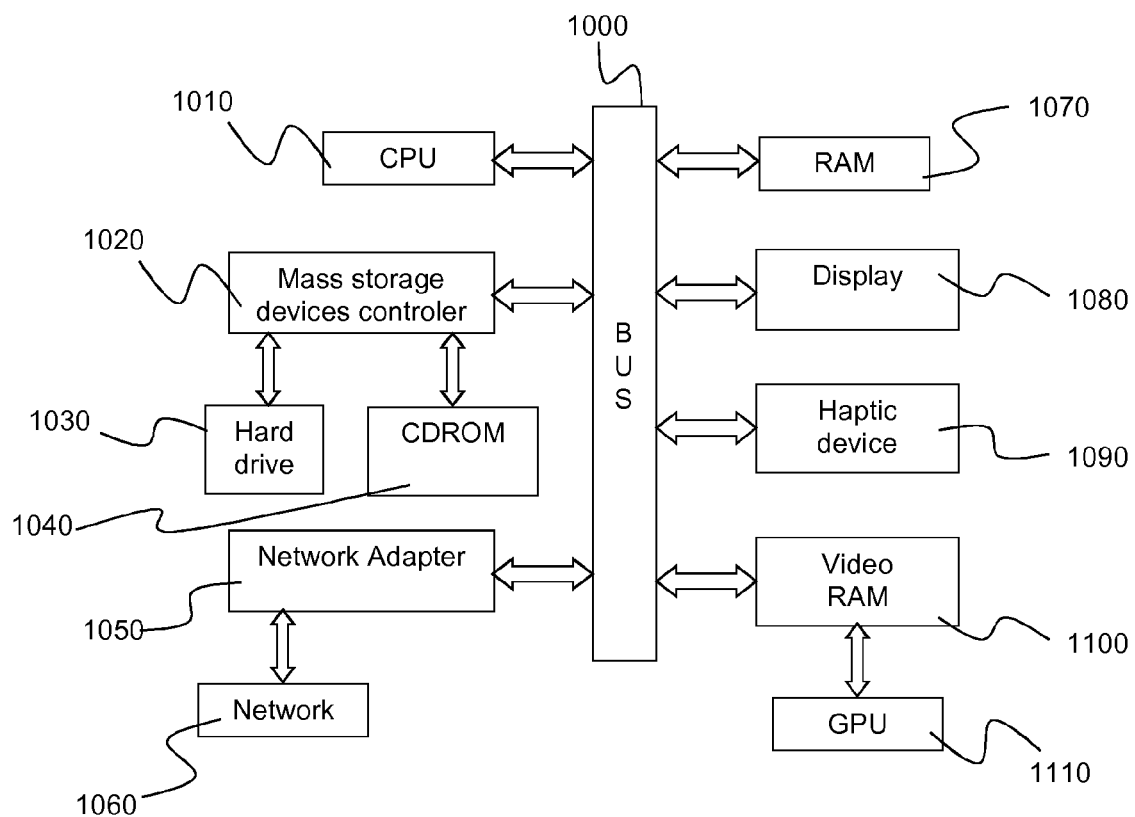
FIG. 3 shows an example of the computer system.

FIG. 3 shows an example of the computer system, wherein the computer system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a physical system" designates any action or series of actions which is at least part of a process of elaborating the physical system. Thus, the method may comprise creating the physical system model from scratch. Alternatively, the method may comprise providing a model previously created, and then modifying the model.

The method may be included in a manufacturing process, which may comprise, after performing the method, producing a physical product corresponding to the designed model. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

The method comprises partitioning S10 the variables involved in the equations into fixed variables and unfixed variables. As explained above, the physical system is constrained by a system of equations involving variables that can take varying values, e.g. which are numeric, real and continuous. These variables are partitioned (i.e. separated) by the method into two sub-sets: on the one hand called "fixed" and on the other hand variables called "unfixed". This may be done via user-interaction, who can determine variables of interest (to navigate) and variables to fix. The method may thus mark each variable as "fixed" or alternatively "unfixed", and thereby achieve the partitioning from a programming point of view. "Fixed" variables are defined by the fact that their value is fixed for the next steps of the method (notably the computing S20 and the navigating S40), whereas "unfixed" variables may have a value that is released and may thus vary. When performing the partitioning S10, the fixed values assigned to the fixed variables may be assigned in any way, for example by the designer, or by departing from the current/pending values (in the case the method is continuously performed, as mentioned later).

In any case, the partitioning S10 is performed so as to set the system of equations to a so-called "restricted system" with a degree of freedom equal to 1. The restricted system is called "restricted" because fixing variables of the initial system amounts to defining a restricted version of the initial system of equations, in the sense that the remaining solutions are a subset of the solutions of the initial system. The partitioning is, by implementation, performed is a way that the degree of freedom of the restricted system is equal to 1 exactly. In other words, the space of solutions authorized by system of equations, taking into account the values assigned to the fixed variables as a constraint, is of dimension 1. Given an initial system of equations, ways to achieve such a restriction are generally accessible to the skilled person. Examples are provided later.

Thanks to the restricted system having a degree of freedom equal to 1, the method may then compute S20 a parameterized curve (i.e. manifold of dimension 1) of solutions of the restricted system in the domain of the unfixed variables. In other words, the method finds all sets of values of the unfixed variables that respect the equations, given the fixed values assigned to the fixed variables, and describes them as a function of one parameter (the parameterized curve).

Then, the method displays information to the designer in a way that facilitates the design, in particular the navigation of the solutions of the restricted system.

In specific, the method comprises, for at least one pair of unfixed variables, displaying S30 the projection of the curve (solutions of the restricted system) in the product of the domains of the pair. In other words, at least one pair of unfixed variables is considered and the product of the domain of each of the two variables is then represented/displayed to the user. Furthermore, the curve is displayed in this 2D representation. More exactly, the curve is projected on this 2D representation, thus resulting in a 2D curve, not necessarily continuous. Thus, the user has a clear and 2D hint of the values taken by the variables under consideration for the solutions of the restricted system. This facilitates design.

Moreover, the method comprises navigating S40 the solutions on the parameterized curve. Although FIG. 1 represents steps of the method as a succession of steps, the displaying S30 is performed throughout the navigating S40. The method comprises representing, real-time, the current navigation position on the projection of the curve. In other words, at each current time a marker of one particular solution (called by definition the "current navigation solution") may be displayed to the user on the display of the projection of the curve (said projection corresponding to the two considered unfixed variables). This way, the user can browse and apprehend easily the solutions of the restricted system, by seeing in 2D how these solutions are translated for the considered variables in specific (the variables for which product of domain pairs are displayed).

The navigating S40 allowed by the method may then be used in any way to design the physical system. For example, the user may simply acquire an understanding of the solutions through the navigating S40. However, the user may also retain one or several specific solution(s) (e.g. of his choice) and store said solutions. The designer may then switch to another representation of the physical system, for example a 3D representation in the above-mentioned case of a physical product, and the designer may then perform another type of design, e.g. 3D geometrical design, e.g. based on, the retained solution. Alternatively, the designer may simply send specifications of the retained solutions to another designer.

An example of the method that helps the designer particularly well is now discussed with reference to FIGS. 4-10.

Figure 4:
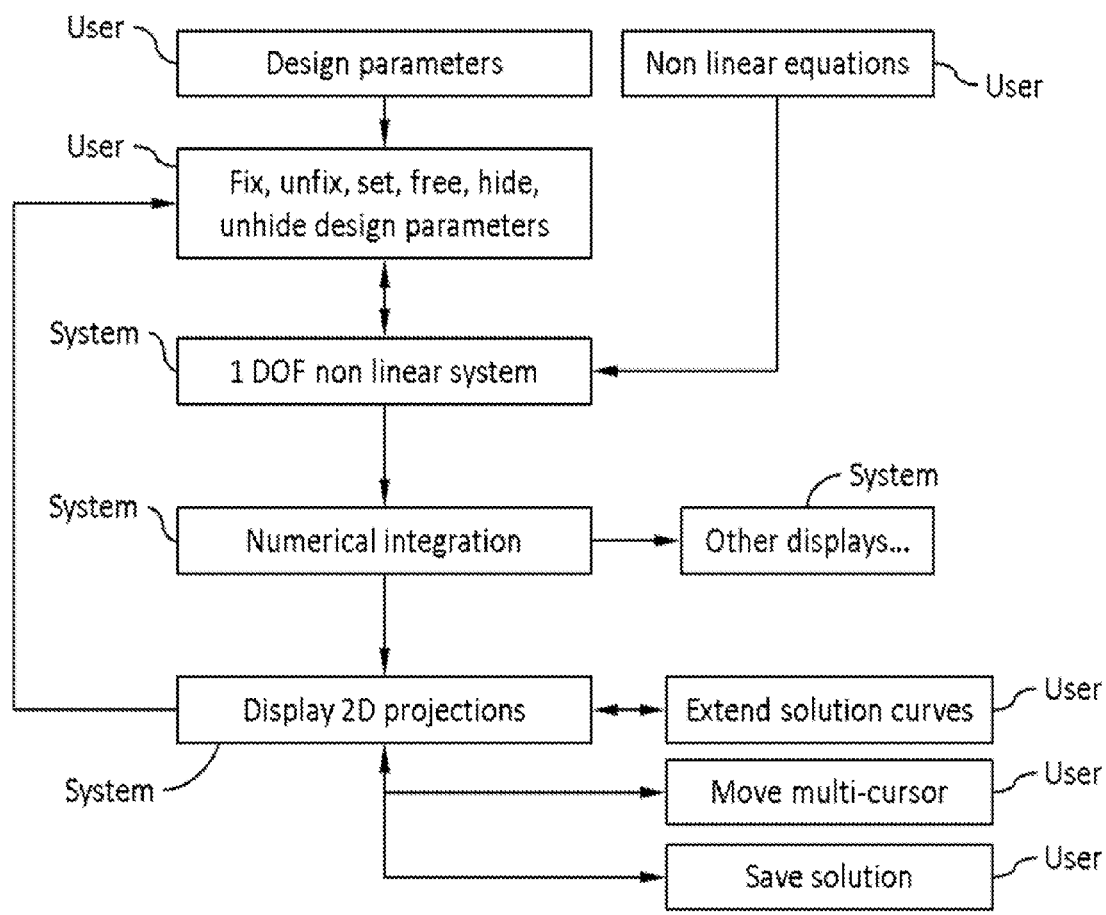
FIGS. 4-10 illustrate an example of the method.
Figure 5:
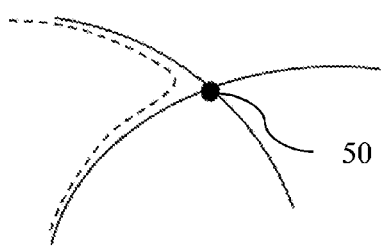

It is referred to FIG. 4 which shows a flowchart of the method of the example. Given a list of nonlinear equations and given a list of design parameters represented by variables involved in the said equations, the method of the example provides an interactive way for the user to investigate the set of solutions. By nature, the set of all solutions is a subset of the design parameters space, which is generally a high dimensional space. Starting from an initial solution, the proposed way to navigate in this subset is to move along a curve segment, which is a one-dimensional subset of the set of all solutions. This curve segment is defined and controlled by the user according to the following steps. The user is asked to set fixed values to some design parameters and to free some other design parameters. This setting process is repeated until the number of degrees of freedom (DOF in the following) of the system of equations is exactly one. This is the partitioning S10. The DOF analysis is performed by the system. It may happen that, for simplicity purpose, the user wishes to hide some design parameters from the navigation and from the setting. Despite they are hidden, those parameters are actually involved in the computation S20. Then, the system computes S20 a parameterized curve segment laying on the subspace of unfixed design parameters. The said curve segment is displayed at S30 through a plurality of two-dimensional projections. Any point on the curve segment is a particular solution of the problem. By moving a graphical cursor on this curve at the navigation S40, the user investigates a continuum of solutions. Corresponding design parameters values can be saved for other purpose (display the corresponding configuration of the physical system in a three-dimensional view for example). The curve segment can be expanded as well through end points cursors. At any moment, the designer can fix, unfix, hide, unhide any design parameters and ask for a new curve segment computation. The point on the curve corresponding to the cursor position plays the role of the initial solution for the new curve segment.

The method of the example thus helps the designer to understand how various parameters can influence the solution. This includes parameters correlations as well as optimization. Furthermore, when computing a new curve segment from the current point on an existing curve segment, the method of the example guarantees that the navigation can never get out of the solution set.

The method of the example is now discussed in more details.

First, differential geometry that may be used in the computing S20 is discussed.

Equation smoothness is now discussed.

Let $F: \mathbb{R}^{n+1} \to \mathbb{R}^n$ be a differentiable function $X \mapsto F(X)$. Scalar coordinates of function F are noted $$F = \begin{pmatrix} f_1 \\ \vdots \\ f_n \end{pmatrix}$$

For each index $i=1, \ldots, n$, the gradient vector of the scalar function $f_i$ is noted $\nabla f_i$. Noting $X=(x_1, \ldots, x_{n+1})$, the coordinates of $\nabla f_i$ are:

$$\nabla f_i = \begin{pmatrix} \frac{\partial f_i}{\partial x_1} \\ \vdots \\ \frac{\partial f_i}{\partial x_{n+1}} \end{pmatrix}$$

Notation U* is the transpose matrix (resp. vector) of matrix (resp. vector) U. Consequently, $\nabla f_i^*$ is a line vector as opposed to $\nabla f_i$, which is a column vector.

$$\nabla f_i^* = \left( \frac{\partial f_i}{\partial x_1}, \ldots, \frac{\partial f_i}{\partial x_{n+1}} \right)$$

With these notations, the derivative $F'(X) \in \mathcal{L}(\mathbb{R}^{n+1}, \mathbb{R}^n)$ of function F at point X can be written:

$$F'(X) = \begin{pmatrix} \nabla f_1^*(x_1, \ldots, x_{n+1}) \\ \vdots \\ \nabla f_n^*(x_1, \ldots, x_{n+1}) \end{pmatrix}$$

From the modeling point of view, the range of the linear mapping F'(X) is supposed to be maximal (meaning that its dimension is n) for all X in an open subset of $\mathbb{R}^{n+1}$. Otherwise, the equations modeling the engineering problem are not well defined, and the method may stop and ask the user to provide new equations.

Differential equations are now discussed.

Let $T: \mathbb{R}^{n+1} \to \mathbb{R}^{n+1}$ be the vector field associated with function F and defined as follows. For $j=1, \ldots, n+1$, the j-th coordinate of T, noted $T_j$, is the $(n+1) \times (n+1)$ determinant:

$$T_j = \det \begin{pmatrix} \nabla f_1^* \\ \vdots \\ \nabla f_n^* \\ e_j \end{pmatrix}$$

For, $i=1, \ldots, n$ the i-th line of the determinant is the transpose gradient vector of function $f_i$. The last line of the determinant is $e_j$, the j-th canonical vector of $\mathbb{R}^{n+1}$. It is well known from state of the art that, for all $X \in \mathbb{R}^{n+1}$, $F'(X)T(X)=0$.

Let $X_0 \in \mathbb{R}^{n+1}$ be a particular solution of equation F=0, meaning that $F(X_0)=0$. If $T(X_0) \neq 0$, then the solution of equation F=0 in the neighborhood of $X_0$ is a unique (under re-parameterization) non-degenerate arc of curve $t \mapsto X(t)$, meaning that $X(0)=X_0$ and that $F(X(t))=0$ for all t in a neighborhood of 0. The arc of curve t ↦ X(t) is advantageously computed by integrating the first order ordinary differential equation:

$$X' = T(X)$$

$$X(0) = X_0$$

Notation X' is the derivation with respect to parameter t, meaning $$X' = \frac{dX}{dt}.$$

Continuation issue is now discussed.

If the solution set of equation F(X)=0 is a curve featuring a bifurcation point (e.g. bold point 50 in FIG. 5), the solution of the previous differential equation is not able to step over the crossing point. The differential solution will either "stops" at the bifurcation point or takes the turn and run along the crosswise branch (dotted trajectory in next figure). Furthermore, there is no way to predict which turn the differential solution will take.

If this behavior is not satisfactory, a continuation algorithm can be implemented by the method instead of solving the differential equation. For example, the method may implement any existing algorithm to "jump over" the bifurcation point, e.g. by taking a large enough step size. A typical reference for numerical continuation and bifurcation management is E. L Allgower, K. Georg, "*Introduction to numerical continuation methods*", SIAM, 2003.

Now, the method of the example is described in a particular case

The method of the example is described in the case of a system modeled by three scalar equations involving six design parameters (variables).

$$f(a,b,c,d,e,)=0$$

$$g(a,b,c,d,e,k)=0$$

$$h(a,b,c,d,e,k)=0$$

The input data of the method of the example in this case is an initial solution, that is a known value ($a_0$, $b_0$, $c_0$, $d_0$, $e_0$, $k_0$) such that:

$$f(a_0,b_0,c_0,d_0,e_0,k_0)=0$$

$$g(a_0,b_0,c_0,d_0,e_0,k_0)=0$$

$$h(a_0,b_0,c_0,d_0,e_0,k_0)=0$$

Since there are 3 scalar equations, the number of free parameters should be 4 and, consequently, the number of fixed parameters should be two. Other cases may be handled in any way, for example by stopping the method or asking the user help decision via interaction. In the normal case, the user is asked at S10 to fix two parameter values, say:

$$b = b_0$$

$$c = c_0$$

Then, the system checks that unfixed parameters a, d, e, k define a regular curve solution of equations:

$$f(a,b_0,c_0,d,e,k)=0$$

$$g(a,b_0,c_0,d,e,k)=0$$

$$h(a,b_0,c_0,d,e,k)=0$$

This checking is to apply the above-mentioned differential geometry formulas to function $F: \mathbb{R}^4 \to \mathbb{R}^3$ defined by:

$$F(a,d,e,k) = \begin{pmatrix} f(a,b_0,c_0,d,e,k) \\ g(a,b_0,c_0,d,e,k) \\ h(a,b_0,c_0,d,e,k) \end{pmatrix}$$

the vector field associated with function $f$ is t: $\mathbb{R}^4 \to \mathbb{R}^4$ $$T(a,d,e,k) = \begin{pmatrix} T_1(a,d,e,k) \\ T_2(a,d,e,k) \\ T_3(a,d,e,k) \\ T_4(a,d,e,k) \end{pmatrix}$$

Noting the 3×4 matrix:

$$M(a,d,e,k) = \begin{pmatrix} \frac{\partial f}{\partial a}(a,b_0,c_0,d,e,k) & \frac{\partial f}{\partial d}(a,b_0,c_0,d,e,k) & \frac{\partial f}{\partial e}(a,b_0,c_0,d,e,k) & \frac{\partial f}{\partial k}(a,b_0,c_0,d,e,k) \\ \frac{\partial g}{\partial a}(a,b_0,c_0,d,e,k) & \frac{\partial g}{\partial d}(a,b_0,c_0,d,e,k) & \frac{\partial g}{\partial e}(a,b_0,c_0,d,e,k) & \frac{\partial g}{\partial k}(a,b_0,c_0,d,e,k) \\ \frac{\partial h}{\partial a}(a,b_0,c_0,d,e,k) & \frac{\partial h}{\partial d}(a,b_0,c_0,d,e,k) & \frac{\partial h}{\partial e}(a,b_0,c_0,d,e,k) & \frac{\partial h}{\partial k}(a,b_0,c_0,d,e,k) \end{pmatrix}$$

The method of the example thus computes vector field coordinates, which define a "generalized cross product" as they provide the tangent directions of the solution curve, and which are:

$$T_1(a,d,e,k) = \det\begin{pmatrix} M(a,d,e,k) \\ 1\ 0\ 0\ 0 \end{pmatrix}$$

$$T_2(a,d,e,k) = \det\begin{pmatrix} M(a,d,e,k) \\ 0\ 1\ 0\ 0 \end{pmatrix}$$

$$T_3(a,d,e,k) = \det\begin{pmatrix} M(a,d,e,k) \\ 0\ 0\ 1\ 0 \end{pmatrix}$$

$$T_4(a,d,e,k) = \det\begin{pmatrix} M(a,d,e,k) \\ 0\ 0\ 0\ 1 \end{pmatrix}$$

If the initial value of the vector field does not vanish, that is if:

$$T(a_0,d_0,e_0,k_0) \neq 0$$

Then, the solution curve $$t \mapsto \begin{pmatrix} a(t) \\ d(t) \\ e(t) \\ k(t) \end{pmatrix}$$

starting at initial point is computed at S20 by integrating the first order differential equation:

$a' = T_1(a,d,e,k)$ $d' = T_2(a,d,e,k)$ $e' = T_3(a,d,e,k)$ $k' = T_4(a,d,e,k)$

Associated with the initial condition:

$a(0) = a_0$ $d(0) = d_0$ $e(0) = e_0$ $k(0) = k_0$ over an interval $[t_{min}, t_{max}]$ where $t_{min} < 0$ and $t_{max} > 0$.

If the vector field vanishes at initial solution, that is if $T(a_0, d_0, e_0, k_0) = 0$, then the solution curve cannot be computed by using the first order differential equation. The user is asked to fix/unfix other parameters until one initial vector field value is non-zero. If all choices lead to a zero initial vector field, the initial solution $(a_0, b_0, c_0, d_0, e_0, k_0)$ is singular and the user is asked to provide another one.

Figure 6:
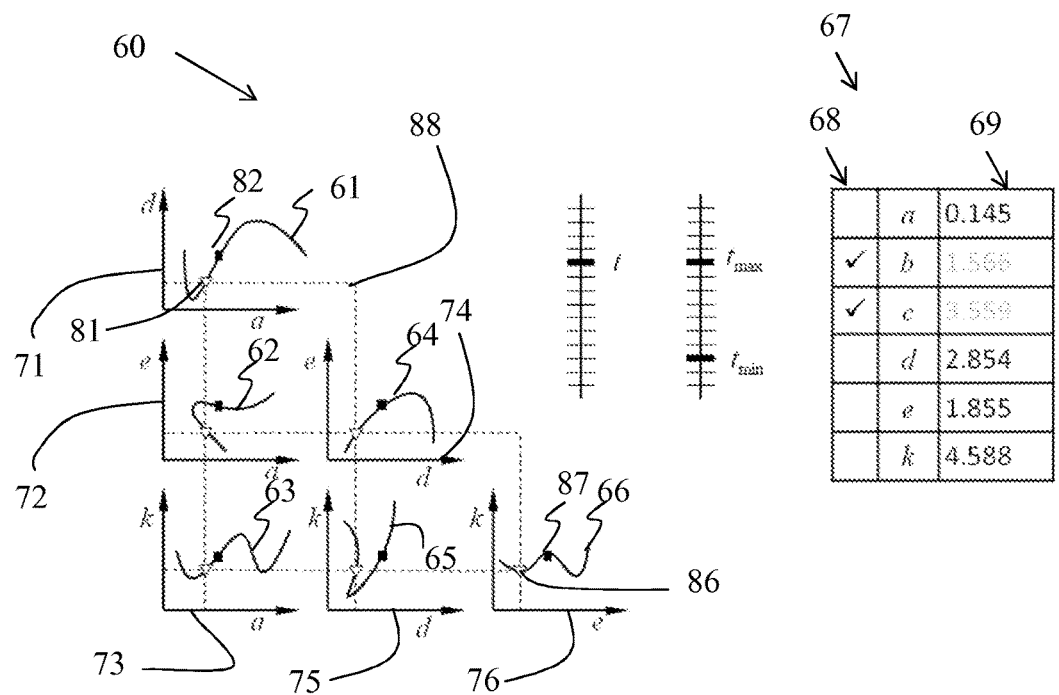

The graphical user interface used in the method of the example is now discussed to illustrate the enhancement of the user experience provided by the method. FIG. 6 illustrates the user interface 60 corresponding to the example. User interface 60 notably comprises a series of elements that are displayed to the user.

As explained above, the method of the example partitions variables (a, b, c, d, e, k) involved in the equations (f=0, g=0, h=0) into fixed variables (b, c) and unfixed variables (a, d, e, k) via user-interaction. The user then sets/defines fixed values for the fixed variables, thereby setting the system to a restricted system with a degree of freedom equal to 1. This is represented by check points in column 68 aside the variable names of displayed table 67, and a shade off of the values taken by the fixed variables in column 69 (1.566 for b and 3.559 for c in the case of the example). The method then computes a parameterized curve of solutions of the restricted system in the domain of the unfixed variables.

Then in the case of the example, the method displays, for all pairs of unfixed variables, the projections (61, 62, 63, 64, 65, 66) of the curve in the product of the domains of the pair, represented as orthonormal frames (71, 72, 73, 74, 75, 76). The user may then navigate the solutions on the parameterized curve and the method represents, real-time, the current navigation position on each displayed projection of the curve, which is performed as a point (81, 86) (triangular point in the case of the example) on each displayed projection of the curve (only two points of the six points are referenced for the sake of conciseness on the figure).

The navigation is easily performed continuously (i.e. in a smooth manner, with a visual continuity, i.e. no visual "jump" of the point (81, 86)) by sliding a cursor t displayed to the user and corresponding to the parameter underlying the computed parameterized curve of solutions of the restricted system. As cursor t is slid, the points (81, 86) representing the current navigation position also slide on the curve projections (61, 62, 63, 64, 65, 66). This allows the user to understand the correlation/interdependency/mutual influence between pairs of variables. Also, boundaries $t_{max}$ and $t_{min}$ are displayed to the user as cursors on a same bar. The user may modify the boundaries by sliding the cursors on the bar. Such cursors allow a particularly intuitive navigation. Also, as the navigation is performed real-time, user-interface 60 updates real-time the values contained in column 69 (except for the fixed variables b and c).

Orthonormal frames (71, 72, 73, 74, 75, 76) are such that the X-axis and the Y-axis each correspond to a respective one of a pair of unfixed variables for which the projection of the curve in the product of the domains of the pair is represented. For example, the X-axis of orthonormal frame 71 corresponds to variable a and the Y-axis of orthonormal frame 71 corresponds to variable d, orthonormal frame 71 thus representing the values taken by the pair (a, d) as the solution curve is navigated. Orthonormal frames allow an intuitive thus fast understanding of the correlation/interdependency between the two variables to which they correspond, because they are orthogonal. And because they are in specific orthonormal (unit step size for both X and Y axis), they allow the later explained triangular representation.

In the example, frames with an X-axis corresponding to the same unfixed variable are vertically aligned and frames with a Y-axis corresponding to the same unfixed variable are horizontally aligned. In other words, the frames are displayed organized in horizontal rows and vertical columns, and all frames of a same row have an Y-axis corresponding to the same unfixed variable (e.g. Y-axis of middle row of FIG. 6 correspond to variable e) and all frames of a same column have an X-axis corresponding to the same unfixed variable (e.g. X-axis of middle column of FIG. 6 correspond to variable d). This allows catching correlations of all variables with one given variable in an easy way, as they are gathered aligned in a row or column.

In the example, for all the pairs of the set, the frames are in specific arranged according to a triangular grid. More generally, this arrangement in a triangular grid may be granular, as explained later, in the sense that several such triangular grids may be displayed, each for a respective set of unfixed variables (which are thus gathered into distinct sets for such triangular representation). In all cases, such a triangular representation increases cognitive perception by the user of the correlations between variables.

To enhance the perception of the user, representing the current navigation position on the projection of the curves may comprise displaying a marker of the horizontal and vertical alignment of the projection of the current navigation position on the projection of the curves. In other words, some visual information stressing out the alignment of the different projections of the current navigation position, i.e. points (81, 82) in the example, may be displayed to the user. This marker is displayed as dotted lines 88 joining points (81, 82) in the case of the example. This way, the user can see better the correlations between variables.

The curve segment boundaries $t_{min}$ and $t_{max}$ can be adjusted interactively in order to expand the curve. Two-dimensional projection curves projections (61, 62, 63, 64, 65, 66) are arranged according to a triangular pattern more detailed in the following. The bold square points (82, 87) represent the initial solution. The triangular points (81, 86) represent the current solution point on the solution curve (61, 66). The user can move the current point along the curve by using the t slider. Dotted 88 lines materialize the relationships of the current solution point on all the two-dimensional projections. Moving the t slider displaces the triangular point on all 2D curves together with corresponding dotted lines.

Figure 7:
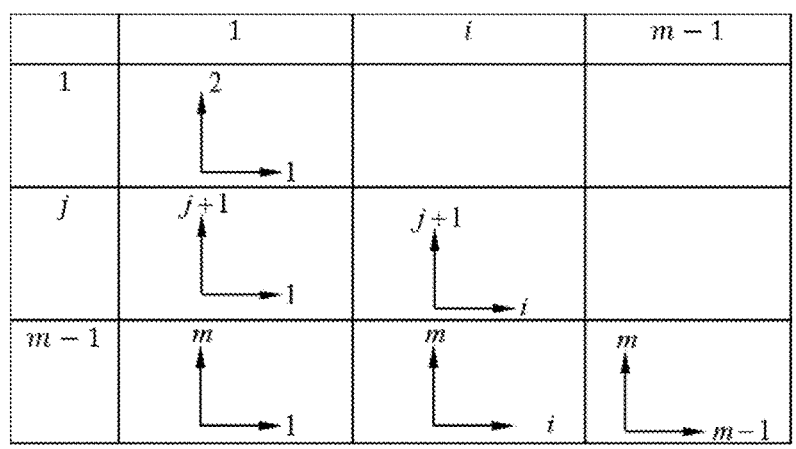

As explained above, the method of the example provides a specific pattern of 2D projections: triangular grids. One basic feature of graphical user interface 60 is indeed the "pattern of 2D projections", illustrated in FIG. 6. Formally, it is defined by a set of m parameters numbered from 1 to m. The pattern consists of $$\frac{m(m-1)}{2}$$

bi-dimensional axis systems noted S(i, j) arranged according to a planar triangular grid, meaning that i=1, ..., m−1, j=1, ..., m−1 and j≥i. The horizontal axis of axis system S(i, j) is labeled with parameter number i and the vertical axis of axis system S(i, j) is labeled with parameter number j+1. This way, all horizontal axis of the grid are vertically aligned and all vertical axis of the grid are horizontally aligned. This property allows horizontal and vertical lines (dotted lines 88 in FIG. 6) materializing the multiple cursors dependencies. FIG. 7 illustrates the triangular grid and axis labels in the general case.

The method of the example has been explained for one navigation phase until now. However, it is noted that the method may be iterated. More particularly, the partitioning S10, the computing S20, and the displaying S30 may be iterated. Such iteration is interesting in the case the partitioning S10 is different between two successive iterations. In other words, after performing one navigation phase as explained above, the method may reiterate the partitioning S10, thus leading to a different setting of unfixed variables and fixed variables, and thus a different restriction of the initial system. The computed solution curve may thus also be different from the one of the previous iteration, and so is thus the displaying S30 (notably as the unfixed variables may be different or the projection of the curve may be different). This way, the user can navigate in a new area of the solution space of the initial system of equations, not accessible in the previous iteration, as the solution space of two different restricted systems are generally different. This offers flexibility to the user.

In particular, the navigation position may be the same at the transition between two successive iterations. In other words, the values taken by all the variables (fixed or unfixed) may serve as the starting point to compute the solution curve of the next iteration of S20 and to display points 81 and 86 (then confounded with points 82 and 87) at the beginning of the next iteration of S30/S40. This allows a smooth transition from one solution curve to another curve. This way, the user explores the solution space by following curves, changing the curve from one iteration of the navigation phase to another, in a smooth and continuous manner, thereby having a better understanding of the explored solutions.

As mentioned earlier, the triangular grid displaying of the frames may be performed not necessarily for all unfixed variable, but also possibly for subset(s) of all the unfixed variables. The user may actually determine the set(s) of unfixed variables for which the displaying S30 is performed. This allows a refinement of the navigation S40.

Determining the at least one set of unfixed variables may notably comprise hiding one or more unfixed variables, i.e. excluding them from the displaying S30.

In some circumstances, some design parameters are not relevant for navigation purpose. For example, when designing a mechanical assembly, the user can be interested in dimensional parameters only and would like to ignore positional parameters. By definition, dimensional parameters set the dimensions of the rigid bodies of the assembly, and positional parameters set the positions of the rigid bodies. In this case, the user can define a set of said "hidden parameters". Of course, they are involved in computations, but they are not displayed in the 2D projections and the user is not asked to provide numerical values for them. Hidden parameters, if any, are set free by the system.

Figure 8:
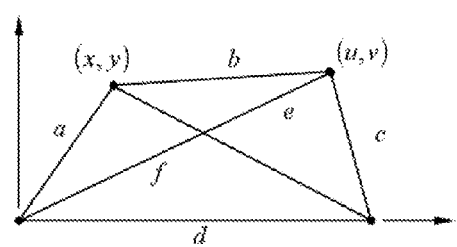

For example, the over-constraint four bars assembly in FIG. 8 is designed by the nonlinear system of equations F(a, b, c, d, e, f, x, y, u, v)=0 where:

$$F(a, b, c, d, e, f, x, y, u, v) = \begin{pmatrix} x^2 + y^2 - a^2 \\ (u-x)^2 + (v-y)^2 - b^2 \\ (u-d)^2 + v^2 - c^2 \\ u^2 + v^2 - e^2 \\ (x-d)^2 + y^2 - f^2 \end{pmatrix}$$

The user is typically, in this example, only interested in dimensional parameters dependency a, b, c, d, e, f defining lengths of bars. In this case, parameters x, y, u, v are set "hidden" by the user and the system sets them "free". Since the nonlinear system features five equations, exactly six parameters must be free for navigation purpose. Since the four hidden parameters are already free, the user is asked to fix four values among the six dimensional parameters, say $a=a_0$, $b=b_0$, $c=c_0$ and $d=d_0$. Then, from the system point of view, the navigation is performed on the one DOF nonlinear system $F(a_0, b_0, c_0, d_0, e, f, x, y, u, v)=0$ by considering the partial function $\mathbb{R}^6 \to \mathbb{R}^5$ defined by $(e, f, x, y, u, v) \mapsto F(a_0, b_0, c_0, d_0, e, f, x, y, u, v)$. This means that the navigation curve is computed in a 6-dimensional space:

$$t \mapsto \begin{pmatrix} e(t) \\ f(t) \\ x(t) \\ y(t) \\ u(t) \\ v(t) \end{pmatrix}$$

Figure 9:
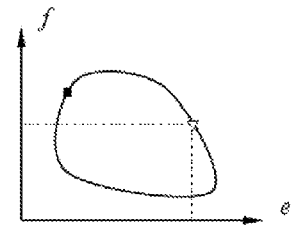

But, from the user point of view, the curve segment $$t \mapsto \begin{pmatrix} e(t) \\ f(t) \end{pmatrix}$$

is displayed in the 2D space of e, f parameters, as represented on FIG. 9. Afterward, the user can free and fix other dimensional parameters in any way, provided only two of them are free (for the example).

In addition, determining the at least one set of unfixed variables may comprise splitting the group of unhidden unfixed variables into sets. In other words, unfixed variables involved in the displaying S30 may be separated into different groups, each represented separately, e.g. according to a triangular grid respective to each group. In such a case, the pairs of unfixed variables involved in the displaying are not all pairs determined for all groups, but within a same group for each group.

For semantic purpose it may be useful to split the set of design parameters into subsets. For example, when designing a mechanical assembly, the subset of dimensional parameters and the subset of positional parameters is a relevant classification.

Figure 10:
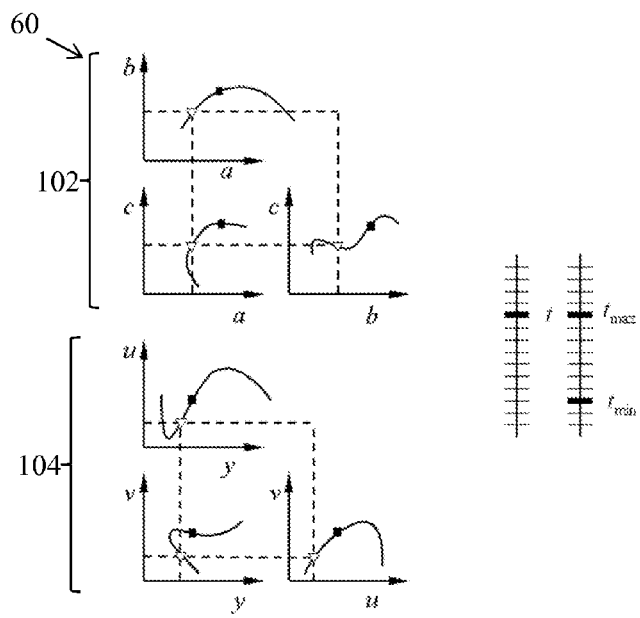

The user interface of the invention displays one pattern of 2D projections for each subset of design parameters (triangular pattern 102 for variables a, b, c and triangular pattern 104 for variables u, v, y, as represented on FIG. 10). Let m be the number of design parameters, q the number of subsets and $m_i$, i=1, ..., q the number of design parameters in the i-th subset. Instead of one pattern of 2D projections defined by m parameters, the system displays q patterns of 2D projections respectively defined by $m_i$ parameters. Consequently, the number of 2D axis systems is reduced from $$\frac{m(m-1)}{2}$$

down to $$\frac{1}{2}\sum_{i=1}^{q} m_i(m_i-1).$$

Furthermore, patterns of 2D projections associated with each subset of design parameters are displayed separately, making the user interface simpler.

It must be noticed that subsets of design parameters are not supposed to be disjoint. Two subsets can share design parameters. Even when displaying several patterns of 2D projections, the system always displays a unique t slider, which drives all cursors of all 2D curve segments. For example, back to the problem F(a, b, c, d, e, f, x, y, u, v)=0, the user creates two subsets of design parameters: the dimensional parameters a, b, c, d, e, f and the positional parameters x, y, u, v. Since the equation F=0 includes five scalar equations, the user is asked to set numerical values to four design parameters, say $d=d_0$, $e=e_0$, $f=f_0$ and $x=x_0$. The system computes the curve segment in a six-dimensional space by considering the partial function (a, b, c, y, u, v) ↦ F(a, b, c, $d_0$, $e_0$, $f_0$, $x_0$, y, u, v)=0. According to the subsets definition, the system displays two patterns of 2D projections respectively defined by {a, b, c} and {y, u, v}, as illustrated in FIG. 10.

In this example, thanks to the subsets definition, the number of 2D curves is 6, which is much smaller than the total number of 2D curves defined by 6 design parameters: 15.

The invention claimed is:

1. A computer-implemented method for designing a physical system, the physical system being one or more of a mechanical product, a mechatronic product, an electrical product, a packaging product, an architectural product, a rigid assembly, and a mobile mechanism, the physical system being constrained by a system of equations involving variables taking varying values, the method comprising the steps of:

partitioning the variables involved in the equations into fixed variables and unfixed variables, a fixed variable being a variable of which value is fixed during the method, an unfixed variable being a variable of which value remains varying during the method, wherein the partitioning includes marking via user-interaction within a graphical user interface (GUI) each variable as fixed or unfixed, wherein marking a variable as fixed fixes the value of the variable, the partitioning of the variables resulting in that the system of equations is set to a restricted system, the restricted system having a degree of freedom equal to 1;

computing a parameterized curve of solutions of the restricted system, the parameterized curve of solutions being computed in a product of domains of all the unfixed variables, wherein the parameterized curve describes, for at least one pair of unfixed variables, the set of all pairs of values of the respective pair of unfixed variables that respect the system of equations, given the fixed values assigned to the fixed variables, as a function of one parameter;

for the at least one pair of unfixed variables, displaying a two-dimensional projection within the GUI of the curve in the product of the domains of the respective pair, wherein the two-dimensional projection of the curve is a two-dimensional line displayed in a two-dimensional orthonormal frame of which the X-axis and the Y-axis each correspond to a respective one of the respective pair of unfixed variables; and navigating the solutions on the parameterized curve and representing, in real-time in the GUI, a current navigation position on the two-dimensional projection of the curve, wherein at each current time a marker of the current navigation solution is displayed to the user in the GUI on the display of the two-dimensional projection of the curve;

wherein the displaying of the two-dimensional projection of the curve is performed for several pairs of unfixed variables in respective two-dimensional orthonormal frames, wherein frames having an X-axis corresponding to the same unfixed variable are vertically aligned with each other and frames having a Y-axis corresponding to the same unfixed variable are horizontally aligned with each other, such that all of the frames that are displayed are arranged according to a triangular grid, wherein representing the current navigation position on the two-dimensional projection of the curve comprises displaying a marker of horizontal and vertical alignment of a projection of the current navigation position on the two-dimensional projection of the curve, the marker including horizontal and vertical lines joining points corresponding to said projection of the current navigation position.

2. The method of claim 1, wherein the partitioning, the computing, and the displaying are iterated, the partitioning being different between two successive iterations.

3. The method of claim 2, wherein the navigation position is the same at a transition between two successive iterations.

4. The method of claim 3, wherein the navigating is continuous.

5. The method of claim 4, wherein the navigating comprises sliding, by the user, a displayed cursor.

6. The method of claim 5, wherein the method comprises determining the at least one pair of unfixed variables by the user.

7. The method of claim 6, wherein determining the at least one pair of unfixed variables comprises at least one of: hiding one or more unfixed variables and splitting a group of unhidden unfixed variables into sets.

8. A non-transitory computer program product comprising:
a computer-readable storage medium; and
instructions carried on the storage medium for designing a physical system constrained by a system of equations involving variables, the designing being by:
partitioning the variables involved in the equations into fixed variables and unfixed variables, a fixed variable being a variable of which value is fixed during the designing, an unfixed variable being a variable of which value remains varying during the designing, wherein the partitioning includes marking via user-interaction within a graphical user interface (GUI) each variable as fixed or unfixed, wherein marking a variable as fixed fixes the value of the variable, the partitioning of the variables resulting in that the system of equations is set to a restricted system, the restricted system having a degree of freedom equal to 1,
computing a parameterized curve of solutions of the restricted system, the parameterized curve of solutions being computed in a product of domains of all the unfixed variables, wherein the parameterized curve describes, for at least one pair of unfixed variables, the set of all pairs of values of the respective pair of unfixed variables that respect the system of equations, given the fixed values assigned to the fixed variables, as a function of one parameter,
for the at least one pair of unfixed variables, displaying a two-dimensional projection within the GUI of the curve in the product of the domains of the respective pair, wherein the two-dimensional projection of the curve is a two-dimensional line displayed in a two-dimensional orthonormal frame of which the X-axis and the Y-axis each correspond to a respective one of the respective pair of unfixed variables, and
navigating the solutions on the parameterized curve and representing, in real-time within the GUI, a current navigation position on the two-dimensional projection of the curve, wherein at each current time a marker of the current navigation solution is displayed to the user in the GUI on the display of the two-dimensional projection of the curve;
wherein the displaying of the two-dimensional projection of the curve is performed for several pairs of unfixed variables in respective two-dimensional orthonormal frames, wherein frames having an X-axis corresponding to the same unfixed variable are vertically aligned with each other and frames having a Y-axis corresponding to the same unfixed variable are horizontally aligned with each other, such that all of the frames that are displayed are arranged according to a triangular grid,
wherein representing the current navigation position on the two-dimensional projection of the curve comprises displaying a marker of horizontal and vertical alignment of a projection of the current navigation position on the two-dimensional projection of the curve, the marker including horizontal and vertical lines joining points corresponding to said projection of the current navigation position.

9. The computer program product of claim 8, wherein the physical system is a mechanical product, a mechatronic product, an electrical product, a biological body, a packaging product, an architectural product, a multi-physic system, a financial system, or a demographic evolution model.

10. A computer system comprising:
a computer memory; and
a processor coupled to the memory and a graphical user interface (GUI), the memory embodying instructions causing the processor to design a physical system constrained by a system of equations involving variables, the processor designing the physical system by:
partitioning the variables involved in the equations into fixed variables and unfixed variables, a fixed variable being a variable of which value is fixed during the designing, an unfixed variable being a variable of which value remains varying during the designing, wherein the partitioning includes marking via user-interaction within the GUI each variable as fixed or unfixed, wherein marking a variable as fixed fixes the value of the variable, the partitioning of the variables resulting in that the system of equations is set to a restricted system, the restricted system having a degree of freedom equal to 1,
computing a parameterized curve of solutions of the restricted system, the parameterized curve of solutions being computed in a product of domains of all the unfixed variables, wherein the parameterized curve describes, for at least one pair of unfixed variables, the set of all pairs of values of the respective pair of unfixed variables that respect the system of equations, given the fixed values assigned to the fixed variables, as a function of one parameter,
for the at least one pair of unfixed variables, displaying a two-dimensional projection within the GUI of the curve in the product of the domains of the respective pair, wherein the two-dimensional projection of the curve is a two-dimensional line displayed in a two-dimensional orthonormal frame of which the X-axis and Y-axis each correspond to a respective one of the respective pair of unfixed variables, and
navigating the solutions on the parameterized curve and representing, in real-time in the GUI, a current navigation position on the two-dimensional projection of the curve, wherein at each current time a marker of the current navigation solution is displayed to the user in the GUI on the display of the two-dimensional projection of the curve;
wherein the displaying of the two-dimensional projection of the curve is performed for several pairs of unfixed variables in respective two-dimensional orthonormal frames, wherein frames having an X-axis corresponding to the same unfixed variable are vertically aligned with each other and frames having a Y-axis corresponding to the same unfixed variable are horizontally aligned with each other, such that all of the frames that are displayed are arranged according to a triangular grid,
wherein representing the current navigation position on the two-dimensional projection of the curve comprises displaying a marker of horizontal and vertical alignment of a projection of the current navigation position on the two-dimensional projection of the curve, the marker including horizontal and vertical lines joining points corresponding to said projection of the current navigation position.

11. A computer system as claimed in claim 10, wherein the physical system is a mechanical product, a mechatronic product, an electrical product, a biological body, a packaging product, an architectural product, a multi-physic system, a financial system, or a demographic evolution model.

* * * * *